United States Patent Office 3,280,107
Patented Oct. 18, 1966

3,280,107
CERTAIN HEXAHYDRO-1,5-DINITRO-3-SUBSTI-
TUTED-1H-1,3,5-TRIAZEPINE COMPOUNDS
Stanley J. Strycker, Midland, Mich., assignor to The Dow
Chemical Company, Midland, Mich., a corporation of
Delaware
No Drawing. Filed Sept. 21, 1964, Ser. No. 398,027
8 Claims. (Cl. 260—239)

This application is a continuation-in-part of my copending application Serial Number 307,795, filed on September 10, 1963, and subsequently abandoned.

The present invention is directed to organic chemistry and is particularly directed to triazepine compound of the formula

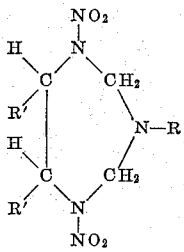

and to methods and compositions employing such compound for the modification and alteration of the growth of numerous organisms. In this and succeeding formulae, R represents phenyl, substituted phenyl, naphthyl, pyridyl, substituted alkyl, or cyclic-substituted methyl, and each R′ independently represents hydrogen or methyl. These novel compounds are crystalline solid materials which are somewhat soluble in many common organic solvents and of very low solubility in water.

Thus, in one part, the present invention is directed to aryltriazepine compounds of the formula

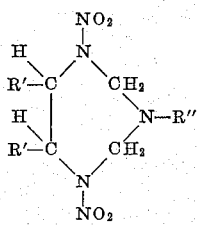

and to methods and compositions employing such compounds for the modification and alteration of the growth of numerous organisms. In this and succeeding formulae, R″ represents phenyl, substituted phenyl, or naphthyl.

In another part, the present invention is directed to substituted aliphatic triazepine compounds of the formula

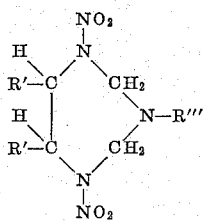

and to methods and compositions employing such compounds for the modification and alteration of the growth of numerous organisms. In this and succeeding formulae R‴ represents substituted alkyl or cyclic-substituted methyl.

In yet another part, the present invention is directed to pyridyltriazepine compounds of the formula

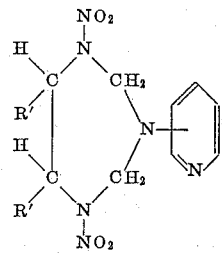

and to methods and compositions employing such compounds for the modification and alteration of the growth of numerous organisms.

In the present specification and claims, substituted phenyl refers to a phenyl radical which is ring substituted with one or more substituent moieties selected from the group consisting of halo, loweralkyl, loweralkoxy, loweralkylthio, cyano, thiocyanato (that is, —SCN), carboxy, loweralkoxycarbonyl, that is

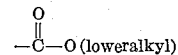

hydroxy, acetoxy, and acetyl. Where every substituent moiety is halo, and/or loweralkyl, the substituted phenyl radical can be substituted by, subject only to known factors of steric hindrance, up to and including five substituent moieties. Where not every substituent moiety is halo and/or loweralkyl, the substituted phenyl radical can be substituted by one or two substituent moieties. Representative substituent moieties include methyl, propyl, butyl, sec-butyl, isobutyl, methoxy, isopropoxy, tert-butoxy, ethoxy, methylthio, ethylthio, propylthio, isopropylthio, butylthio, tert-butylthio, carbomethoxy, and carbo-n-butoxy.

In the present specification and claims, the term "substituted alkyl" is employed to designate an alkyl radical being of from 1 to 10, inclusive, carbon atoms, and being mono-substituted by a substituent moiety selected from the group consisting of halo, loweralkoxy, cyano, ammoniumoxycarbonyl, that is,

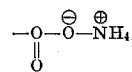

(triloweralkylammonium)oxycarbonyl, that is,

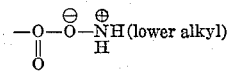

carbamoyl, carboxy, loweralkoxycarbonyl, alkali metaloxycarbonyl, sulfo, alkali metaloxysulfonyl, hydroxy, and mercapto.

In the present specification and claims, the term "cyclic-substituted methyl" is employed to designate a radical selected from the group consisting of cyclopropylmethyl, furylmethyl, (tetrahydrofuryl)methyl, thenyl, tetrahydrothenyl, 5-norbornen-2-ylmethyl, and tetrahydro-pyran-2-ylmethyl. The furylmethyl and (tetrahydrofuryl)-methyl radicals in which the furyl moiety is attached to the methyl moiety at the 2-position of the furyl ring are commonly named furfuryl and tetrahydrofurfuryl. Therefore, the term furylmethyl is generic to and inclusive of furfuryl and 3-furylmethyl, and the term (tetrahydrofuryl)methyl is generic to and inclusive of tetrahydrofurfuryl and (tetrahydro-3-furyl)methyl.

Thus, the terms substituted alkyl and cyclic-substituted methyl, taken jointly, refer to an alkyl radical being of from 1 to 10, inclusive, carbon atoms, and being monosubstituted by a substituent moiety selected from the group consisting of halo, loweralkoxy, cyano, ammoniumoxycarbonyl, that is,

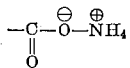

(triloweralkylammonium)oxycarbonyl, that is,

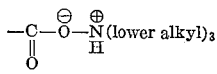

carbamoyl, carboxy, loweralkoxycarbonyl, alkali metaloxycarbonyl, sulfo, alkali metaloxysulfonyl, hydroxy, mercapto, and, in the instance where the alkyl radical is of only 1 carbon atom, cyclopropyl, furyl, tetrahydrofuryl, thienyl, tetrahydrothienyl, 5-norbornen-2-yl, and tetrahydropyran-2-yl.

In the present specification and claims, the terms "loweralkyl," "loweralkoxy," and "loweralkylthio" refer to radicals being of from one to four, both inclusive, carbon atoms; the term "halo" designates bromo or chloro only; and the term "alkali metaloxy" designates radicals whereof the alkali metal is sodium or potassium.

All of the compounds of the present invention are prepared by reacting together a N,N'-dinitroethylenediamine compound having the formula

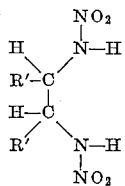

formaldehyde, and an amine having the formula

The formaldehyde can be supplied to the reaction site in any of its known forms, conveniently, for example, the 37 percent aqueous formaldehyde, commonly known as formalin, trioxane, paraformaldehyde, or formaldehyde in gaseous state.

The reaction is conveniently carried out in the presence of an inert liquid reaction medium, such as, for example, benzene, chloroform, tetrahydrofuran, and ethyl acetate. Also, where the formaldehyde reactant employed is an aqueous formaldehyde, such as formalin, excess of such aqueous formaldehyde can be employed as inert liquid reaction medium. The amounts of the reactants to be employed are not critical, some of the desired product compound being obtained when employing the reactants in any amounts. However, the reaction consumes the reactants in amounts which represent one molecular proportion of the N,N'-dinitroethylenediamine compound, two molecular proportions of formaldehyde, and one molecular proportion of amine; the use of amounts which represent such proportions, or such proportions with a slight excess of the formaldehyde reactant, is preferred, and usually results in the production of optimum yields.

The reaction goes forward at temperatures between −15° and 100°, and conveniently, at temperatures between 5° and 25°, with the production of the desired product in the reaction mixture together with water as a byproduct. In carrying out the reaction, the reactants are contacted together in any convenient fashion and maintained for a period of time in the reaction temperature range to complete the reaction. Some of the desired product compound is formed immediately upon the contacting together of the reactants; however, the yield of the desired product compound is increased by permitting the reaction mixture to stand for a period of time.

The reactants can be contacted together in any order; however, it is preferred to first contact together the N,N'-dinitroethylenediamine compound and the formaldehyde. A further preferred practice in the present invention comprises heating such mixture of ethylenediamine and formaldehyde, in the presence of an inert liquid reaction medium, to the temperature at which the N,N'-dinitroethylenediamine compound becomes dispersed in the formaldehyde, cooling the resulting dispersed mixture to the preferred temperature range of 5° to 25° C., and adding the amine reactant to the cooled mixture.

Following the completion of the reaction, the reaction mixture can be employed for the useful purposes of the present invention; also, the desired product compound can be separated from the reaction mixture by filtration and/or the reaction medium removed by distillation or evaporation under subatmospheric pressure. As a result of such operations, the desired product compound is obtained as a residue. This residue can be used without purification or can be purified by conventional procedures, such as, for example, recrystallization, washing with inert liquid reaction medium, and the like.

The following examples illustrate the triazepine compound of the present invention but are not to be construed as limiting.

*Example 1.—Hexahydro-1,5-dinitro-3-p-tolyl-1H-1,3,5-triazepine*

N,N'-dinitroethylenediamine (15.0 grams; 0.1 mole) and 37 percent aqueous formaldehyde (24 grams; 0.3 mole) were mixed together. To the resulting mixture was added in one portion 10.7 grams of p-toluidine (0.10 mole). The addition was carried out at room temperature of about 25° C. The resulting reaction mixture was heated to a temperature of about 50° C. and held at that temperature for a period of fifteen minutes. The mixture was then cooled to a temperature of about 0–5° C. and the mixture filtered to separate the hexahydro-1,5-dinitro-3-p-tolyl-1H-1,3,5-triazepine product as a residue.

The product residue was dispersed in a mixture of ethanol and ethyl acetate in which mixture the product separated as a white crystalline solid. The solid was separated by filtration and further purified by recrystallization from a mixture of isopropanol and ethyl acetate. The product melts at 159.5–160.5° C.

*Example 2.—Hexahydro-1,5-dinitro-3-(2-carboxyethyl)-1H-1,3,5-triazepine*

N,N'-dinitroethylenediamine (15.0 grams; 0.1 mole) and 37 percent aqueous formaldehyde (64.0 grams; 0.8 mole) were mixed together and the resulting mixture warmed over a steam bath for a short period of time. Thereafter, the warmed mixture was cooled to a temperature of about 5° C., and 8.9 grams (0.1 mole) of β-alanine (3-aminopropionic acid) added portionwise to the cooled mixture to obtain a reaction mixture. Following the completion of the addition of the β-alanine, the reaction mixture was held at a temperature of about 5° C. As the reaction mixture was thus held, the hexahydro-1,5-dinitro - 3 - (2-carboxyethyl)-1H-1,3,5-triazepine product appeared in the reaction mixture as a white, crystalline solid. Thereafter, however, to insure completion of the reaction, the reaction mixture was diluted by the addition of 150 milliliters of water, and the diluted reaction mixture held, with stirring, at a temperature of 5–10° C. for a period of two hours. Afterwards, the reaction mixture was filtered to separate the product as a residue.

The product residue was recrystallized from isopropanol and the recrystallized product found to melt at 126.5–127.5.

*Example 3:—Hexahydro-3-(1-naphthyl)-1,5-dinitro-1H-1,3,5-triazepine*

N,N' - dinitroethylenediamine (15.0 grams; 0.10 mole) 37 percent aqueous formaldehyde (24 grams; 0.3 mole), and 1-naphthylamine (14.3 grams; 0.10 mole) were mixed together in 150 milliliters of ethyl acetate. The resulting mixture was warmed to a temperature of 60° C., with stirring, maintained at that temperature for one hour, and thereafter cooled to room temperature. The cooled reaction mixture was filtered to obtain the hexahydro - 3 - (1 - naphthyl) -1,5 - dinitro - 1H - 1,3,5-triazepine product as a residue. The product residue was dried and thereafter recrystallized from a portion of methyl ethyl ketone. The product melts at 185–186.5° with decomposition.

*Example 4.—Hexahydro-1,5-dinitro-3-furfuryl-1H-1,3,5-triazepine*

N,N'-dinitroethylenediamine (15.0 grams; 0.1 mole); 37 percent aqueous formaldehyde (24 grams; 0.3 mole); and 150 milliliters of ethyl acetate were mixed together. Furfurylamine (9.7 grams; 0.1 mole) was added rapidly portionwise to the resulting mixture at room temperature to obtain a reaction mixture. As the addition was carried out, the temperature of the resulting mixture rose to about 35° C. Afterwards, the reaction mixture was heated to a temperature of about 50° C., held at that temperature for about 30 minutes, and thereafter permitted to cool to room temperature. The cooled reaction mixture was filtered to separate the hexahydro-1,5-dinitro-3-furfuryl-1H-1,3,5-triazepine product as a residue. The product residue was purified by recrystallization from ethanol. The recrystallized product melts at 127–128° C.

In a similar manner, other representative compounds of the present invention are prepared, as follows:

From N,N'-dinitroethylenediamine, formaldehyde, and p-chloroaniline, a solid 3-(p-chlorophenyl)hexahydro-1,5-dinitro - 1H - 1,3,5-triazepine product melting at 168–168.5° C.

From N,N'-dinitro-2,3-butanediamine, formaldehyde, and the triethylamine salt of 2-carboxyethylamine, a product which is the triethylamine salt of hexahydro-6,7-dimethyl - 1,5 - dinitro - 3 - (2 - carboxyethyl) - 1H-1,3,5-triazepine. The product has a molecular weight of 392.5.

From N,N'-dinitro-2,3-butanediamine, formaldehyde, and aniline, hexahydro-6,7-dimethyl-1,5-dinitro-3-phenyl-1H-1,3,5-triazepine product having a molecular weight of 295.3.

From N,N'-dinitroethylenediamine, formaldehyde, and 2 - hydroxyethylamine, hexahydro - 1,5 -dinitro - 3 - (2-hydroxyethyl)-1H-1,3,5-triazepine product melting at 103–104° C.

From N,N'-dinitro-2,3-butanediamine, formaldehyde, and hydroxymethylamine, hexahydro-1,5-dinitro-6,7-dimethyl - 3 - (hydroxymethyl) - 1H - 1,3,5 - triazepine product having a molecular weight of 249.2.

From N,N'-dinitroethylenediamine, formaldehyde, and aniline, hexahydro - 1,5 - dinitro - 3 - phenyl - 1H - 1,3,5-triazepine product melting at 159.5–160.5° C.

From N,N'-dinitro-1,2-propanediamine, formaldehyde, and 8 - hydroxyoctylamine, hexahydro - 1,5 - dinitro-6-methyl - 3 - (8 - hydroxyoctyl) - 1H - 1,3,5 - triazepine product having a molecular weight of 333.4.

From N,N'-dinitro-1,2-propanediamine, formaldehyde, and aniline, hexahydro-6-methyl-1,5-dinitro-3-phenyl-1H-1,3,5-triazepine product having a molecular weight of 281.3.

From N,N'-dinitroethylenediamine, formaldehyde, and 2 - hydroxypropylamine, hexahydro - 1,5 - dinitro - 3 - (2-hydroxypropyl)-1H-1,3,5-triazepine product melting at 127–129° C.

From N,N'-dinitroethylenediamine, formaldehyde, and 3 - hydroxypropylamine, hexahydro - 1,5 - dinitro - 3 - (3-hydroxypropyl)-1H-1,3,5-triazepine product having a molecular weight of 249.2.

From N,N'-dinitroethylenediamine, formaldehyde, and 2,4,5-trichloroaniline, hexahydro-1,5-dinitro-3-(2,4,5-trichlorophenyl) - 1H - 1,3,5-triazepine product (molecular weight of 370.6).

From N,N'-dinitroethylenediamine, formaldehyde, and 3 - acetyl - 5 - ethylaniline, 3 - (3 - acetyl - 5 - ethylphenyl) - hexahydro - 1,5 - dinitro - 1H - 1,3,5 - triazepine (molecular weight of 337.3).

From N,N'-dinitroethylenediamine, formaldehyde, and 3 - carboxypropylamine, hexahydro - 1,5 - dinitro - 3 - (3-carboxypropyl)-1H-1,3,5-triazepine product melting at 146.5–147.5° C.

From N,N'-dinitro-1,2-propanediamine, formaldehyde, and meta-bromoaniline, 3-(meta-bromophenyl)-hexahydro-6-methyl-1,5-dinitro-1H-1,3,5-triazepine product having a molecular weight of 360.2.

From N,N'-dinitroethylenediamine, formaldehyde, and p-methoxyaniline, hexahydro-3-(p-methoxyphenyl) - 1,5-dinitro-1H-1,3,5-triazepine product melting at 131–132° C.

From N,N'-dinitro-1,2-propanediamine, formaldehyde, and 6-carboxyhexylamine, hexahydro-1,5-dinitro-6-methyl-3-(6-carboxyhexyl)-1H-1,3,5-triazepine product having a molecular weight of 333.4.

From N,N'-dinitroethylenediamine, formaldehyde, and p-bromoaniline, 3-(p-bromophenyl)hexahydro-1,5-dinitro-1H-1,3,5-triazepine product melting at 163–164.5° C.

From N,N'-dinitroethylenediamine, formaldehyde, and the sodium salt of carboxymethylamine, a product which is the sodium salt of hexahydro-1,5-dinitro-3-(carboxymethyl)-1H-1,3,5-triazepine. This product melts at 181–182° C.

From N,N'-dinitroethylenediamine, formaldehyde, and 2-bromoethylamine, hexahydro-1,5-dinitro-3-(2 - bromoethyl)-1H-1,3,5-triazepine product having a molecular weight of 298.1.

From N,N'-dinitro-1,2-propanediamine, formaldehyde, and ortho-toluidine, hexahydro-6-methyl-1,5-dinitro-3-ortho-tolyl-1H-1,3,5-triazepine product having a molecular weight of 295.3.

From N,N'-dinitroethylenediamine, formaldehyde, and the ethyl ester of carboxymethylamine, a product which is the ethyl ester of hexahydro-1,5-dinitro-3-(carboxymethyl)-1H-1,3,5-triapezine. This product melts at 135–136° C.

From N,N'-dinitroethylenediamine, formaldehyde, and m-butoxyaniline, 3-(m-butoxyphenyl)hexahydro - 1,5 - dinitro-1H-1,3,5-triazepine (molecular weight of 339.3).

From N,N'-dinitro-2,3-butanediamine, formaldehyde, and the n-butyl ester of 9-carboxynonylamine, a product which is the n-butyl ester of hexahydro-1,5-dinitro-6,7-dimethyl-3-(9-carboxynonyl)-1H-1,3,5-triazepine product. This product has a molecular weight of 445.6.

From N,N'-dinitroethylenediamine, formaldehyde, and 2-naphthylamine, hexahydro-3-(2-naphthyl)-1,5 - dinitro-1H-1,3,5-triazepine product melting at 177–178.5° C.

From N,N'-dinitro-2,3-butanediamine, formaldehyde, and 1-naphthylamine, hexahydro-6,7-dimethyl-3-(1-naphthyl)-1,5-dinitro-1H-1,3,5-triazepine product having a molecular weight of 345.4.

From N,N'-dinitroethylenediamine, formaldehyde, and 10-carboxydecylamine, hexahydro-1,5-dinitro-3 - (10-carboxydecyl)-1H-1,3,5-triazepine product melting at 102–105° C.

From N,N'-dinitro-1,2-propanediamine, formaldehyde, and 5-chloro-1,5-dimethylhexylamine, hexahydro-1,5-dinitro-6-methyl-3-(5-chloro-1,5-dimethylhexyl) - 1H-1,3,5-triazepine product having a molecular weight of 351.8.

From N,N'-dinitroethylenediamine, formaldehyde, and 2-ethyl-5-isopropylaniline, 3-(2-ethyl-5 - isopropylphenyl) hexahydro-1,5-dinitro - 1H - 1,3,5 - triazepine (molecular weight of 337.3).

From N,N'-dinitroethylenediamine, formaldehyde, and 3-acetoxy-5-methoxyaniline, 3-(3 - acetoxy - 5 - methoxyphenyl)hexahydro-1,5-dinitro-1H-1,3,5-triazepine (molecular weight of 339.3).

From N,N'-dinitroethylenediamine, formaldehyde, and 2-methoxyethylamine, hexahydro-1,5-dinitro-3-(2 - methoxyethyl)-1H-1,3,5-triazepine product melting at 103.5–105° C.

From N,N'-dinitroethylenediamine, formaldehyde, and n-butoxymethylamine, hexahydro-1,5-dinitro-3-(n-butoxymethyl)-1H-1,3,5-triazepine product having a molecular weight of 277.3.

From N,N'-dinitroethylenediamine, formaldehyde, and m-chloroaniline, 3-(m-chlorophenyl)hexahydro-1,5 - dinitro-1H-1,3,5-triazepine product melting at 148–149° C.

From N,N'-dinitro-1,2-propanediamine, formaldehyde, and para-ethoxyaniline, 3-(para-ethoxyphenyl)hexahydro-6-methyl-1,5-dinitro-1H-1,3,5-triazepine product having a molecular weight of 325.3.

From N,N'-dinitroethylenediamine, formaldehyde, and 2-chloro-4-tert-butylaniline, 3-(2 - chloro - 4 - tert - butylphenyl)hexahydro-1,5-dinitro-1H-1,3,5-triazepine (molecular weight 357.8).

From N,N'-dinitroethylenediamine, formaldehyde, and 1-methyl-2-methoxyethylamine, hexahydro-1,5-dinitro - 3-(2-methoxy-1-methylethyl)-1H-1,3,5 - triazepine product melting at 87.0–87.5° C.

From N,N'-dinitroethylenediamine, formaldehyde, and 3-cyanopropylamine, hexahydro-1,5-dinitro - (3 - cyanopropyl)-1H-1,3,5-triazepine product having a molecular weight of 258.2.

From N,N'-dinitro-2,3-butanediamine, formaldehyde, and 2,4,5-trichloroaniline, hexahydro-6,7-dimethyl-1,5-dinitro-3-(2,4,5-trichlorophenyl)-1H,1,3,5 - triazepine product having a molecular weight of 398.7.

From N,N'-dinitroethylenediamine, formaldehyde, and o-chloroaniline, 3-(o-chlorophenyl)hexahydro-1,5-dinitro-1H-1,3,5-triazepine product melting at 108.5–109.5° C.

From N,N'-dinitro-1,2-propanediamine, formaldehyde, and 2-mercaptoethylamine, hexahydro-1,5-dinitro-6-methyl-3-(2-mercaptoethyl)-1H-1,3,5 - triazepine product having a molecular weight of 265.3.

From N,N'-dinitroethylenediamine, formaldehyde, and p - (ethylthio)aniline, 3-((p-ethylthio)phenyl)hexahydro-1,5 - dinitro - 1H - 1,3,5 - triazepine (molecular weight of 327.3).

From N,N'-dinitroethylenediamine, formaldehyde, and 2,4-dichloroaniline, 3-(2,4-dichlorophenyl)hexahydro-1,5-dinitro-1H-1,3,5-triazepine product melting at 111–113.5° C.

From N,N'-dinitroethylenediamine, formaldehyde, and 3 - methoxypropylamine, hexahydro - 1,5-dinitro-3-(3-methoxypropyl)-1H-1,3,5-triazepine product melting at 84–85° C.

From N,N'-dinitro-1,2-propanediamine, formaldehyde, and 6-cyanohexylamine, hexahydro-1,5-dinitro-6-methyl-3-(6-cyanohexyl)-1H-1,3,5-triazepine product having a molecular weight of 314.4.

From N,N'-dinitro-1,2-propanediamine, formaldehyde, and para-carboxyaniline, 3-(para-carboxyphenyl)hexahydro-6-methyl-1,5-dinitro-1H,1,3,5-triazepine product having a molecular weight of 325.3.

From N,N'-dinitroethylenediamine, formaldehyde, and 3 - bromo-5-methoxyaniline, 3-(3-bromo-5-methoxyphenyl)hexahydro - 1,5-dinitro-1H-1,3,5-triazepine (molecular weight of 376.1).

From N,N'-dinitro-1,2-propanediamine, formaldehyde, and the ammonium salt of 6-carboxyhexylamine, a product which is the ammonium salt of hexahydro-1,5-dinitro-6 - methyl - 3-(6-carboxyhexyl)-1H-1,3,5-triazepine. The product has a molecular weight of 350.4.

From N,N'-dinitroethylenediamine, formaldehyde, and p-carboxyaniline, 3-(p-carboxyphenyl)hexahydro-1,5- dinitro-1H-1,3,5-triazepine (molecular weight of 311.3).

From N,N'-dinitro - 2,3 - butanediamine, formaldehyde, and para-acetoxyaniline, 3-(para-acetoxyphenyl)hexahydro - 6,7 - dimethyl-1,5-dinitro-1H-1,3,5-triazepine product having a molecular weight of 353.3.

From N,N'-dinitroethylenediamine, formaldehyde, and p - ethoxyaniline, 3 - (p-ethoxyphenyl)hexahydro - 1,5-dinitro-1H-1,3,5-triazepine product melting at 108–109° C.

From N,N'-dinitroethylenediamine, formaldehyde, and 2 - pyridylamine, hexahydro-1,5-dinitro-3-(2-pyridyl)-1H-1,3,5-triazepine product melting at 157.5–158.0.

From N,N'-dinitroethylenediamine, formaldehyde, and 5-carbamoylpentylamine, hexahydro-1,5-dinitro-3-(5-carbamoylpentyl)-1H-1,3,5-triazepine product having a molecular weight of 304.3.

From N,N'-dinitro-1,2-propanediamine, formaldehyde, and meta - (ethylthio)aniline, 3 - (meta-(ethylthio)phenyl)hexahydro - 6 - methyl-1,5-dinitro-1H-1,3,5-triazepine product having a molecular weight of 341.4.

From N,N'-dinitroethylenediamine, formaldehyde, and 2 - chloro - 4-(methylthio)aniline, 3-(2-chloro-4-(methylthio)phenyl)hexahydro - 1,5 - dinitro-1H-1,3,5-triazepine (molecular weight of 315.7).

From N,N'-dinitro-2,3-butanediamine, formaldehyde, and tetrahydropyran - 2-methylamine, hexahydro-1,5-dinitro - 6,7 - dimethyl-3-(tetrahydropyran-2-ylmethyl)-1H-1,3,5-triazepine product having a molecular weight of 317.4.

From N,N'-dinitroethylenediamine, formaldehyde, (in the form of paraformaldehyne), and p-isopropylaniline, hexahydro - 3 - (p-isopropylphenyl)-1,5-dinitro-1H-1,3,5-triazepine product melting at 125–129° C.

From N,N'-dinitroethylenediamine, formaldehyde, and 3-isopropoxypropylamine, hexahydro-1,5-dinitro-3-(3-isopropoxypropyl)-1H-1,3,5-triazepine product melting at 58–59° C.

From N,N' - dinitro-2,3-butanediamine, formaldehyde, and 2-cyanoethylamine, hexahydro-1,5-dinitro-6,7-dimethyl-3-(2-cyanoethyl)-1H-1,3,5-triazepine product having a molecular weight of 272.3.

From N,N' - dinitro-2,3-butanediamine, formaldehyde, and 3-chloro-5-thiocyanatoaniline, 3-(3-chloro-5-thiocyanatophenyl)hexahydro - 6,7 - dimethyl - 1,5 - dinitro-1H-1,3,5-triazepine product having a molecular weight of 386.8.

From N,N'-dinitroethylenediamine, formaldehyde, and p-hydroxyaniline, hexahydro-3-(p-hydroxyphenyl)1,5-dinitro-1H-1,3,5-triazepine product melting at 137–139° C.

From N,N'-dinitroethylenediamine, formaldehyde, and the sodium salt of 3-sulfopropylamine, a product which is the sodium salt of hexahydro-1,5-dinitro-3-(3-sulfopropyl)-1H-1,3,5-triazepine. The product melts at 92–95° C.

From N,N'-dinitro-1,2-propanediamine, formaldehyde, and 8-cyanooctylamine, hexahydro-1,5-dinitro-6-methyl-3-(8-cyanooctyl)-1H-1,3,5-triazepine product having a molecular weight of 342.4.

From N,N'-dinitroethylenediamine, formaldehyde, and 2,4-xylidine, hexahydro-1,5-dinitro-3-(2,4-xylyl)-1H-1,3,5-triazepine product melting at 155–156.5° C.

From N,N'-dinitroethylenediamine, formaldehyde, and tetrahydropyran-2-methylamine, hexahydro-1,5-dinitro-3-(tetrahydropyran-2-ylmethyl)-1H-1,3,5-triazepine product melting at 154–154.5° C.

From N,N'-dinitro-1,2-propanediamine, formaldehyde, and 7-sulfoheptylamine, hexahydro-1,5-dinitro-6-methyl-3-(7 - sulfoheptyl)-1H-1,3,5-triazepine product having a molecular weight of 383.4.

From N,N'-dinitroethylenediamine, formaldehyde, and 4-methoxy-m-toluidine, hexahydro - 1,5-dinitro - 3 - (4-methoxy-m-tolyl)-1H-1,3,5-triazepine (molecular weight of 311.3).

From N,N'-dinitroethylenediamine, formaldehyde, and p-thiocyanatoaniline, hexahydro-1,5 - dinitro-3-(p-thiocyanatophenyl)-1H-1,3,5-triazepine product melting at 126–127° C.

From N,N'-dinitroethylenediamine, formaldehyde, and 5-norbornene-2-methylamine, hexahydro-1,5-dinitro-3-(5-norbornene-2-ylmethyl)-1H-1,3,5-triazepine product melting at 179.5–180° C.

From N,N'-dinitroethylenediamine, formaldehyde, and 3-thenylamine, hexahydro-1,5-dinitro - 3-(3-thenyl)-1H-

1,3,5-triazepine product having a molecular weight of 287.3.

From N,N'-dinitroethylenediamine, formaldehyde, and 3,5-bis(carbomethoxy)aniline, 3-(3,5-bis(carbomethoxy)phenyl)hexahydro-1,5-dinitro-1H-1,3,5-triazepine product having a molecular weight of 383.3.

From N,N'-dinitro-1,2-propanediamine, formaldehyde, ad para-acetylaniline, 3-(para-acetylphenyl)hexahydro-6-methyl-1,5-dinitro-1H-1,3,5-triazepine product having a molecular weight of 323.3.

From N,N'-dinitro-2,3-butanediamine, formaldehyde, and 7-mercaptoheptylamine, hexahydro - 1,5-dinitro-6,7-dimethyl-3-(7-mercaptoheptyl) - 1H-1,3,5-triazepine product having a molecular weight of 349.5.

From N,N'-dinitroethylenediamine, formaldehyde, and 3,5-dimethoxyaniline, 3-(3,5 - dimethoxyphenyl)hexahydro-1,5 - dinitro - 1H-1,3,5-triazepine product having a molecular weight of 327.3.

From N,N'-dinitro-1,2-propanediamine, formaldehyde, and 3-pyridylamine, hexahydro-1,5-dinitro-6-methyl-3-(3-pyridyl)-1H-1,3,5-triazepine product having a molecular weight of 282.3.

From N,N'-dinitroethylenediamine, formaldehyde, and p-(methylthio)aniline, hexahydro - 3 - (p-(methylthio)phenyl)-1,5-dinitro-1H-1,3,5-triazepine product melting at 120° C.

From N,N'-dinitroethylenediamine, formaldehyde, and tetrahydrofurfurylamine, hexahydro-1,5 - dinitro-3-(tetrahydrofuryl) - 1H-1,3,5 - triazepine product melting at 89–90° C.

From N,N'-dinitro-1,2-propanediamine, formaldehyde, and tetrahydro - 2 - thenylamine, hexahydro-1,5-dinitro-6-methyl-3-(tetrahydro-2-thenyl)-1H-1,3,5-triazepine product having a molecular weight of 305.4.

From N,N'-dinitro-2,3-butanediamine, formaldehyde, and para-methoxyaniline, hexahydro-3 - (para-methoxyphenyl)-6,7-dimethyl-1,5-dinitro-1H-1,3,5-triazepine product having a molecular weight of 325.3.

From N,N'-dinitroethylenediamine, formaldehyde, and pentachloroaniline, hexahydro-1,5-dinitro-3-(pentachlorophenyl)-1H-1,3,5-triazepine product having a molecular weight of 379.4.

From N,N'-dinitroethylenediamine, formaldehyde, and cyclopropanemethylamine, hexahydro-1,5 - dinitro - 3-(cyclopropylmethyl)-1H-1,3,5-triazepine product melting at 102–103° C.

From N,N'-dinitroethylenediamine, formaldehyde, and 2,3,4,5-tetramethylaniline, hexahydro-1,5-dinitro-3-(2,3,4,5-tetramethylphenyl)-1H-1,3,5-triazepine product having a molecular weight of 323.4.

From N,N'-dinitro-1,2-propanediamine, formaldehyde, and para-chloroaniline, 3 - (para-chlorophenyl)hexahydro-6-methyl-1,5-dinitro-1H-1,3,5-triazepine product having a molecular weight of 315.7.

From N,N'-dinitro-2,3-butanediamine, formaldehyde, and tetrahydropyran-2-methylamine, hexahydro-1,5-dinitro-6,7 - dimethyl-3-(tetrahydropyran-2-ylmethyl) - 1H-1,3,5-triazepine product having a molecular weight of 317.4.

From N,N'-dinitro-1,2-propanediamine, formaldehyde, and 3-furylmethylamine, hexahydro-1,5-dinitro-6-methyl-3-(3-furylmethyl) - 1H-1,3,5-triazepine product having a molecular weight of 285.3.

From N,N'-dinitroethylenediamine, formaldehyde, and p-cyanoaniline, 3-(p-cyanophenyl)hexahydro-1,5-dinitro-1H-1,3,5-triazepine product having a molecular weight of 292.3.

From N,N'-dinitro-2,3-butanediamine, formaldehyde, and 4-pyridylamine, hexahydro-1,5-dinitro-6,7-dimethyl-3-(4-pyridyl)-1H-1,3,5-triazepine product having a molecular weight of 296.3.

It has been discovered that all of the compounds of the present invention are useful in a wide variety of operations for the modification and alteration of the growth of numerous organisms such as, for example, mite, tick, helminth, bacterial, fungal, plant, and insect organisms. In such operations, a growth altering and/or pesticidal amount of at least one of the triazepine compounds is employed.

It has been further discovered that the exposure of a viable form of plants to the action of the triazepine compound gives rise to different responses depending upon the nature of thte plant, the stage of growth or maturity of the plant, and the dosage of triazepine compound at which the exposure is carried out. Thus, the application to plants, plant parts, and their habitats of a herbicidal amount of triazepine compound suppresses and inhibits the growth of seeds, emerging seedlings, and established vegetation. The application to plants of a lesser and growth-stimulant amount of triazepine compound imparts beneficial effects to the growth of the plants, such as, for example, increased size of produce or of yield of crop; earlier plant maturation; improved qualitative content of plant parts, such as protein content in legumes and in members of the Gramineae family; delayed senescence; and the like. The application of triazepine compound to plants may be made by contacting the compound with seeds, seedlings, established vegetation, roots, stems, flowers, fruits, and the like, or by applying the compound to soil.

The application to the organisms or their habitats of a growth altering amount of triazepine compound is essential and critical for the practice of the present invention. The exact dosage to be supplied is dependent upon the organism, the stage of growth thereof, and, in many instances, the particular part of the organism to which the triazepine compound is applied. Where parasite control is desired, the compounds are employed in parasiticidal amounts. Where the invention is employed to modify and alter the growth of plants, and plant parts, the compounds are employed in plant growth altering amounts. For example, triazepine compound can be applied to plants, plant parts, and their habitats in herbicidal dosages. In foliar applications of herbicidal dosages, liquid compositions containing from about 4,000 or less to 20,000 or more parts of triazepine compound by weight per million parts of ultimate composition can be conveniently applied to plant surfaces. In the application to growth media of herbicidal dosages of triazepine compound, good results are obtained when the compound is supplied to the growth media in an amount of from about 5 to 300 parts or more by weight per million parts by weight of the media. Where the growth media is soil, good results are obtained when the triazepine compound is distributed therein at a rate of from about 20 or less to 300 pounds or more per acre and through such a cross section of the soil as to provide for the presence therein of triazepine compound in an amount of from 20 to 300 parts per million. In such application, it is desirable that the compound be distributed to a depth of at least 0.5 inch and at a substantially uniform dosage of at least 10 pounds per acre inch of soil. The weathering action of the sun, rain, and possibly the decomposition of the agents by the action of soil organisms, eventually reduces their concentration in soil, or other growth media.

In other applications of tthe present triazepine compounds, the active agents are employed in plant growth stimulating dosages. In such operations, good results are obtained when the compounds are applied to plants and plant parts in dosages of from 0.001 or less to 20 or more pounds per acre. In other similar operations, liquid compositions containing from about 1 to about 4,000 or more parts per million can be conveniently applied to the plant surfaces. In the treatment of seed to stimulate seeding growth and obtain improved yield of the plants produced by such seeds, good results are obtained when the seeds are treated with from about 1 to 250 grams (about 0.035 to 9 ounces) of compound per hundred pounds of seed.

The method of the present invention can be carried out by exposing the organisms or their habitats to the action of the unmodified compounds. The present method also comprehends the employment of a liquid or dust composition containing one or more of the present compounds as an active component. In such usage, the active component is modified with one or a plurality of additaments or adjuvants for organism growth modification compositions, such as water or other liquid carriers, surface-active dispersing agents, and finely divided solids. Depending upon the concentration of active compound, such augmented compositions are adapted to be applied to the organisms and their habitats, or to be employed as concentrates and subsequently diluted with additional inert carrier to produce the ultimate treating compositions. In compositions where the adjuvant or helper is a finely divided solid, a surface-active agent or a liquid additament, the carrier cooperates with the active component so as to facilitate the invention, and to obtain an improved and outstanding result.

In addition, the present method also comprehends the employment of aerosol compositions containing one or more of the present compounds as an active agent. Such compositions are prepared according to conventional methods wherein the agent is dispersed in a solvent and the resultant dispersion mixed with a propellant in liquid state. Such variables as the particular compound to be used and the particular substrate to be treated will determine the identity of the solvent and the concentration of the active compound. The solvent should be of low phytotoxicity, such as water, acetone, isopropanol or 2-ethoxyethanol, in compositions to be applied to plants for plant stimulation and crop yield improvement.

The exact concentration of the active compound to be employed in the treating compositions is not critical and can vary considerably provided the required dosage of effective agent is supplied the organism or its habitat. The concentration of the active agent in liquid compositions employed to supply the desired dosage generally is from about 0.0001 to 50 percent by weight. Concentrations of up to 95 percent by weight are oftentimes conveniently employed. In dusts, the concentration of active component can be from about 0.01 to 20 percent by weight. In compositions to be employed as concentrates, the active component can be present in a concentration of from about 5 to 98 percent by weight.

The quantity of the composition applied is not critical provided only that the required dosage of active component is applied in sufficient of the finished composition to cover adequately the organism or habitat to be treated.

Liquid compositions containing the desired amount of active component can be obtained by dissolving the compound in an organic liquid carrier or by dispersing the active agent in water. With the water-insoluble agents, the dispersion is facilitated and conveniently accomplished with the aid of a suitable surface-active dispersing agent such as an ionic or non-ionic emulsifying agent. The aqueous compositions can contain one or more water-immiscible solvents for the active agent. In such compositions, the carrier can comprise an aqueous emulsion, that is, a mixture of water-immiscible solvents, emulsifying agent and water. The choice of dispersing and emulsifying agent and the amount thereof employed is dictated by the nature of the composition type and by the ability of the agent to facilitate the dispersion of the active agent in the carrier to produce the desired composition. Dispersing and emulsifying agents which can be employed in the compositions include the condensation products of alkylene oxides with phenols and organic acids, alkyl aryl sulfonates, polyoxyethylene derivatives of sorbitan esters, complex alcohols, mahogany soaps and the like.

In the preparation of dust compositions, the active component is dispersed in and on a finely divided solid which is non-reactive with the active agents such as talc, chalk, gypsum and the like. In such operations, the finely divided carrier is mixed with the active compound or a volatile organic solvent solution thereof. Similarly, dust compositions containing the active compounds are prepared from various of the solid surface-active dispersing agents, such as bentonite, fuller's earth, attapulgite and other clays. Depending upon the proportion of ingredients, the dust compositions can be employed as concentrates and subsequently diluted with additional solid surface-active dispersing agent or with talc, chalk or gypsum and the like to obtain the desired amount of active component in compositions adapted to be applied to the organisms or their habitats. Also such concentrated dust compositions can be dispersed in water with or without the aid of a dispersing agent, to form spray mixtures. Preferred finely divided solid adjuvants include those which are of low phytotoxicity to plants and plant parts.

When operating in accordance with the present invention, the active agents or compositions containing the agents are applied to the organisms or their habitats in growth-modifying amounts in any convenient fashion, for example, with power dusters, boom and hand sprayers, and spray dusters. In another procedure, the agents or compositions containing the same are drilled into soil and further distributed therein in conventional procedures.

The following examples illustrate the best manner of employing the present invention, and, without more, will enable those skilled in the art to employ the method of the present invention.

*Example 5*

Compositions containing the compounds of the present invention are prepared in various procedures. In one procedure, four parts by weight of one of the triazepine compounds, 0.08 part of sorbitan trioleate (Span 85), and 0.02 part of a sorbitan monolaurate polyoxyethylene derivative (Tween 80) are dispersed in forty milliliters of acetone to produce a concentrate composition in the form of a water-dispersible liquid.

In another procedure, one of the triazepine compounds is formulated in water with an alkyl aryl sulfonate (Nacconol NR) and a substituted benzoid alkyl sulfonic acid (Daxad No. 27) to produce aqueous compositions. In such operations, the materials are ballmilled together to produce compositions containing varying amounts of one of the active agents, 300 parts by weight of Nacconol NR and 300 parts by weight of Daxad No. 27 per million parts by weight of ultimate aqueous mixture. In this manner, ballmilled compositions are prepared from all of the triazepine compounds of the above examples.

*Example 6*

Liquid compositions are prepared with 3-(p-bromophenyl)hexahydro - 1,5 - dinitro - 1H - 1,3,5 - triazepine; 3 - (m - chlorophenyl)hexahydro - 1,5 - dinitro - 1H-1,3,5 - triazepine; hexahydro - 1,5 - dinitro - 3 - phenyl-1H-1,3,5 - triazepine; hexahydro - 1,5 - dinitro - 3 - (3 - isopropoxypropyl) - 1H - 1,3,5 - triazepine; hexahydro - 1,5-dinitro - 3 - p - tolyl - 1H - 1,3,5 - triazepine; hexahydro-1,5 - dinitro - 3 - (cyclopropylmethyl) - 1H - 1,3,5 - triazepine; hexahydro - 3 - (p - methoxyphenyl) - 1,5 - dinitro - 1H - 1,3,5 - triazepine; hexahydro - 1,5 - dinitro-3 - (10 - carboxydecyl) - 1H - 1,3,5 - triazepine; hexahydro - 3 - (2 - naphthyl) - 1,5 - dinitro - 1H - 1,3,5- triazepine; and hexahydro - 3 - (1 - naphthyl) - 1,5 - dinitro-1H-1,3,5-triazepine; in the ballmilling procedure described in Example 5 and each containing an amount of one of the named active agents.

Also, concentrate compositions are prepared as described in Example 5, from 3-(p-chlorophenyl)hexahydro-1,5-dinitro-1H-1,3,5-triazepine and 3 - (p - ethoxyphenyl) hexahydro-1,5-dinitro-1H-1,3,5-triazepine and the resulting concentrates dispersed in water to prepare aqueous compositions each containing an amount of one of the named active agents.

These compositions are employed for the treatment of seed beds of sandy loam soil of good nutrient content. Prior to the treatment, the soil is seeded with the seeds of peas (*Pisum sativum*) and beans (*Phaseolus vulgaris*). In the treating operations, the composition is applied as a soil drench and at a rate of about 0.434 acre inch of aqueous composition per acre to supply varying amounts of one of the compounds per acre and varying concentrations of one of the compounds in the soil. Other areas similarly seeded with the named plant species are left untreated to serve as checks. Following the treating operations, the seed beds are observed at regular intervals to ascertain any appreciable affects upon the germination of the seeds and the growth of the seedlings.

Two weeks following the treating operations, the average height of the plants above the ground line in the treated seed beds is measured and compared with the average height of the plants in the untreated seed beds. At the time the measurements are taken, all of the treated and untreated seed beds support abundant stands of healthy plants of the named species. The results of the measurements, the agents employed, and the concentrations and dosages at which the agents are employed, are set forth in the following table.

emerging seedlings of soy beans. At the time of the observations, the untreated check beds are found to support abundant stems of vigorously growing plants of soy beans.

*Example 8*

Aqueos compositions each containing 1,000 parts by weight of one of various triazepine compounds per million parts by weight of ultimate mixture are prepared according to the procedures of the foregoing examples. These compositions are employed in post emergent applications for the treatment of pea plants. In the treating operations, the compositions are applied as foliage sprays to plots of the pea plants. At the time of the applications, the plants are from two to four inches in height. The treatments are carried out with conventional spraying equipment, the applications being made to the point of run-off. Similar plots of pea plants are left untreated to serve as checks.

Two weeks following the treating operations, the average height above the ground line of the treated pea plants is measured and compared with the average height above the ground line of the untreated pea plants. At the time the measurements are taken, all of the treated and un-

| Test Compound | Concentration of Test Compound in Composition | Dosage of Test Compound | | Percent Greater Stem Elongation of Plants from Treated Soil than from Untreated Soil | |
|---|---|---|---|---|---|
| | | Pounds per acre | Parts per million by weight of soil | Peas | Beans |
| 3-(p-chlorophenyl)hexahydro-1,5-dinitro-1H-1,3,5-triazepine | 0.0086 | 1 | 1.6 | 22 | 25 |
| | 0.0432 | 5 | 8 | 33 | 60 |
| 3-(p-bromophenyl)hexahydro-1,5-dinitro-1H-1,3,5-triazepine | 0.0432 | 5 | 8 | 50 | 56 |
| Hexahydro-1,5-dinitro-3-(3-isopropoxypropyl)-1H-1,3,5-triazepine | 0.0432 | 5 | 8 | 13 | 59 |
| 3-(m-chlorophenyl)hexahydro-1,5-dinitro-1H-1,3,5-triazepine | 0.0086 | 1 | 1.6 | 50 | 33 |
| | 0.0432 | 5 | 8 | 50 | 72 |
| Hexahydro-1,5-dinitro-3-phenyl-1H-1,3,5-triazepine | 0.0086 | 1 | 1.6 | 60 | 56 |
| | 0.0432 | 5 | 8 | 90 | 56 |
| Hexahydro-1,5-dinitro-3-p-tolyl-1H-1,3,5-triazepine | 0.0086 | 1 | 1.6 | 50 | 36 |
| Hexahydro-1,5-dinitro-3-(cyclopropylmethyl)-1H-1,3,5-triazepine | 0.0432 | 5 | 8 | 48 | 45 |
| Hexahydro-3-(p-methoxyphenyl)-1,5-dinitro-1H-1,3,5-triazepine | 0.0086 | 1 | 1.6 | 22 | 33 |
| | 0.0423 | 5 | 8 | 68 | 33 |
| Hexahydro-3-(1-naphthyl)-1,5-dinitro-1H-1,3,5-triazepine | 0.0432 | 5 | 8 | 62 | 40 |
| Hexahydro-1,5-dinitro-3-(10-carboxydecyl)-1H-1,3,5-triazepine | 0.0432 | 5 | 8 | 16 | 16 |
| 3-(p-ethoxyphenyl)hexahydro-1,5-dinitro-1H-1,3,5-triazepine | 0.0086 | 1 | 1.6 | 50 | 50 |
| | 0.0432 | 5 | 8 | 50 | 140 |
| Hexahydro-3-(2-naphthyl)-1,5-dinitro-1H-1,3,5-triazepine | 0.0432 | 5 | 8 | 45 | 20 |

*Example 7*

A concentrate composition is prepared with 3-(p-ethoxyphenyl)hexahydro-1,5-dinitro-1H-1,3,5-triazepine exactly in the manner as described in Example 5 and the composition thereafter dispersed in water to produce an aqeous composition containing 0.432 pound of the compound per 100 gallons of ultimate mixture. This aqueous composition is employed for the treatment of soil and observations made for the control of the growth of seeds and emerging seedlings of soy beans. In these determinations, the composition is employed to treat seed beds which have been prepared and seeds with soy beans. In the treating operations, the composition is applied as a soil drench and at a rate of about 0.434 acre inch of aqueous composition per acre to supply a uniform dosage of about 50 pounds of the active agent per acre. This dosage corresponds to a concentration of about 80 parts by weight of the active agent per million parts by weight of soil. Other adjacent seed beds similarly seeded with soy beans are left untreated to serve as checks.

After about two weeks, the seed beds are examined to ascertain what percent kill and control of the growth of seeds and emerging seedlings of soy beans is obtained. The observations show that in each of the seed beds treated with the active compound, there is obtained a 100 percent kill and control of the growth of the seeds and treated plots support stands of pea plants in healthy condition. The test compounds employed together with the results of the measurements are set forth in the following table.

| Test Compound | Percent Greater Stem Elongation of Treated Pea Plants than of Untreated Pea Plants |
|---|---|
| 3-(p-chlorophenyl)hexahydro-1,5-dinitro-1H-1,3,5-triazepine | 33 |
| Hexahydro-1,5-dinitro-3-(tetrahydropyran-2-ylmethyl)-1H-1,3,5-triazepine | 51 |
| 3-(p-bromophenyl)hexahydro-1,5-dinitro-1H-1,3,5-triazepine | 20 |
| Hexahydro-1,5-dinitro-3-(2-methoxy-1-methylethyl)-1H-1,3,5-triazepine | 43 |
| 3-(m-chlorophenyl)hexahydro-1,5-dinitro-1H-1,3,5-triazepine | 20 |
| Hexahydro-1,5-dinitro-3-phenyl-1H-1,3,5-triazepine | 20 |
| Hexahydro-1,5-dinitro-3-p-tolyl-1H-1,3,5-triazepine | 60 |
| 3-(o-chlorophenyl)hexahydro-1,5-dinitro-1H-1,3,5-triazepine | 33 |
| Hexahydro-3-(2-naphthyl)-1,5-dinitro-1H-1,3,5-triazepine | 50 |
| Hexahydro-3-(1-naphthyl)-1,5-dinitro-1H-1,3,5-triazepine | 33 |
| 3-(p-ethoxyphenyl)hexahydro-1,5-dinitro-1H-1,3,5-triazepine | 25 |

I claim:
1. Compound of the formula

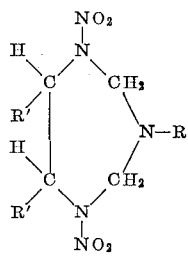

wherein R represents a radical selected from the group consisting of phenyl; phenyl substituted with one or more substituent moieties, each of which is independently selected from the group consisting of halo, loweralkyl, loweralkoxy, loweralkylthio, cyano, thiocyanato, carboxy, loweralkoxycarbonyl, hydroxy, acetoxy, and acetyl, there being, when every substituent is a member selected from the group consisting of halo and loweralkyl, from one to five such substituents, and there being, when one substituent is a member selected from the group consisting of loweralkoxy, loweralkylthio, cyano, thiocyanato, carboxy, loweralkoxycarbonyl, hydroxy, acetoxy, and acetyl, from one to two total substituents; naphthyl; pyridyl; alkyl being of from 1 to 10, inclusive, carbon atoms, and being mono-substituted by a substituent moiety selected from the group consisting of halo, lower-alkoxy, cyano, ammoniumoxycarbonyl, (triloweralkyl-ammonium)oxycarbonyl, carbamoyl, carboxy, loweralkoxycarbonyl, alkali metaloxycarbonyl, sulfo, alkali metaloxysulfonyl, hydroxy, and mercapto; cyclopropylmethyl; furylmethyl; (tetrahydrofuryl)methyl; thenyl; tetrahydrothenyl; 5-norbornen-2-ylmethyl; and tetrahydropyran-2-ylmethyl; and each R' independently represents a member selected from the group consisting of hydrogen and methyl.

2. Hexahydro-1,5-dinitro-3-phenyl-1H-1,3,5-triazepine.
3. 3 - (p-chlorophenyl)hexahydro-1,5-dinitro-1H-1,3,5-triazepine.
4. Hexahydro - 1,5-dinitro-3-(2-hydroxyproyl)-1H-1,3,5-triazepine.
5. Hexahydro-1,5-dinitro-3-p-tolyl-1H-1,3,5-triazepine.
6. Hexahydro - 3-(p-methoxyphenyl)-1,5-dinitro-1H-1,3,5-triazepine.
7. Hexahydro - 3 - (1-naphthyl)-1,5-dinitro-1H-1,3,5-triazepine.
8. Hexahydro - 1,5-dinitro-3-(tetrahydrofurfuryl)-1H-1,3,5-triazepine.

References Cited by the Examiner

UNITED STATES PATENTS

| | | | |
|---|---|---|---|
| 2,556,664 | 6/1951 | Smith et al. | 71—2.5 |
| 2,665,203 | 1/1954 | Emerson et al. | 71—2.5 |
| 2,983,725 | 5/1961 | Picard | 260—239 |
| 3,069,477 | 12/1962 | Lee et al. | 260—239 |
| 3,205,221 | 9/1965 | Johnson et al. | 260—239 |

OTHER REFERENCES

Chute et al.: Chem. Abstracts, vol. 213, pp. 9074–9075 (1949).

ALEX MAZEL, *Primary Examiner.*

JAMES O. THOMAS, JR., HENRY R. JILES, *Examiners.*

ALTON D. ROLLINS, *Assistant Examiner.*